(12) United States Patent
Takagi et al.

(10) Patent No.: US 6,493,001 B1
(45) Date of Patent: Dec. 10, 2002

(54) METHOD, APPARATUS AND MEDIUM FOR DESCRIBING A VIRTUAL SHARED SPACE USING VIRTUAL REALITY MODELING LANGUAGE

(75) Inventors: Tatsuya Takagi; Masayuki Ishikawa, both of Chiba; Koichi Matsuda, Tokyo, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/389,812

(22) Filed: Sep. 4, 1999

(30) Foreign Application Priority Data

Sep. 3, 1998 (JP) .................................... 10-249353

(51) Int. Cl.[7] ................................................ G06F 3/00
(52) U.S. Cl. ........................ 345/759; 345/706; 345/757
(58) Field of Search ................................. 345/700, 706, 345/751, 753, 756–759, 764, 769, 770, 781, 810, 835, 836, 839, 848, 849

(56) References Cited

U.S. PATENT DOCUMENTS

| | | | | |
|---|---|---|---|---|
| 5,491,743 A | * | 2/1996 | Shiio et al. ................. | 345/759 |
| 5,880,731 A | * | 3/1999 | Liles et al. ................. | 345/473 |
| 5,956,038 A | * | 9/1999 | Rekimoto .................... | 345/419 |
| 5,999,208 A | * | 12/1999 | McNerney et al. ......... | 345/757 |
| 6,219,045 B1 | * | 4/2001 | Leahy et al. ................ | 345/757 |

* cited by examiner

Primary Examiner—Crescelle N. dela Torre
(74) Attorney, Agent, or Firm—Bell, Boyd & Lloyd LLC

(57) ABSTRACT

Method and apparatus for describing a virtual shared space with ease includes a user interface unit which displays a list of avatars (or an avatar page) kept in a scene-graph database on a resource library window. A drag-and-drop operation is carried out by the user on an icon representing an avatar selected from those displayed on the avatar page of the resource library window to add the avatar to the avatar page of a multi-user window. The user interface unit detects the drag-and-drop operation carried out by the user, displaying the dragged and dropped avatar icon on the avatar page of the multi-user window as an additional avatar. Then, in accordance with this drag-and-drop operation, a file input/output unit places the file of the dragged and dropped avatar in a location where a VRML file being edited is recorded, that is, generates an avtimg directory and an avtwrl directory and describes predetermined avatar data therein.

52 Claims, 9 Drawing Sheets

METHOD, APPARATUS AND MEDIUM FOR DESCRIBING A VIRTUAL SHARED SPACE USING VIRTUAL REALITY MODELING LANGUAGE

RELATED APPLICATIONS

This application is related to application entitled: Method, Apparatus and Presentation Medium For Avoiding A Mismatch State In A 3-Dimensional Virtual Shared Space, patent app. Ser. No. 09/389,801; application entitled: Method, Apparatus And Presentation Medium For Multiple Auras In A virtual Shared Space , patent app. Ser. No. 09/389,803; application entitled: Information Processing Apparatus, Method and entitled: Information Processing Apparatus, Method and Computer Program for Virtual Reality Aura Setting patent app. Ser. No. 09/389,803 application entitled: Information Processing Apparatus, Method and Computer Program for Virtual Reality Transparent Avatars patent app. Ser. No. 09/390,803, and application entitled: Information Processing Apparatus, Method and Computer Program for Virtual Reality Object Management Using Auras patent app. Ser. No. 09/390,036; , each of the above-referenced applications are assigned to Sony Corporation of Japan, the assignee of the present application, and each of the above-referenced applications are concurrently filed herewith, the disclosures of which are incorporated herein by reference.

CLAIM TO FOREIGN PRIORITY UNDER 35 USC §119

The present application claims priority to Japanese application No P10-249353 filed on Sep. 3, 1998 in Japan.

BACKGROUND OF THE INVENTION

1. Field of the Invention

The present invention generally relates to an information processing apparatus, an information processing method and a presentation medium. More particularly, the present invention relates to an information processing apparatus, an information processing method and a presentation medium for describing a virtual shared space using Virtual Reality Modeling Language (VRML).

2. Description of the Related Art

A Virtual Reality Modeling Language (VRML) is a descriptive language which can be used for uniformly handling 3-dimensional information by utilizing a construction of a World Wide Web ("WWW" or "the web") for providing various kinds of information over the internet at a worldwide scale. The web has been developed by the European Center for Nuclear Research (CERN) of Switzerland, and enables information including text, picture, sound and the like to be transmitted asynchronously to an information processing terminal such as a personal computer in accordance with a protocol called a Hyper Text Transfer Protocol (HTTP) so that the information can be viewed and heard in HTTP format. HTTP is a protocol for transmitting files described in the HTML format over the internet and operates to transmit hypertext information of an HTML file to a client terminal in response to a request issued to the web server from client terminal.

A web server includes a server software called HTTP daemon and HTML files each used for storing hypertext information. The daemon software is a computer program executed for carrying out control and processing in the background in a UNIX environment. The hypertext information is expressed by using a descriptive language called an Hyper Text Markup Language (HTML). In an hypertext description using HTML, a logical structure of a statement is expressed by a format specification called a tag sandwiched between the symbols "<" and ">". A link to other information is described by using a link information called an anchor. When a location of information is specified by using the anchor, a string of characters called a Uniform Resource Locator (URL) is utilized.

A popular environment for utilizing the web is a client software called a web browser such as Netscape Navigator® available from Netscape Communications, Inc., of Internet Explorer® available from Microsoft Corporation. By using such web browsers, it is possible to view a home page which is a file specified by a URL in the web server on the internet built at a worldwide scale through internet surfing in which home pages connected to each other by links are traced sequentially one after another in order to allow user accesses to a variety of information sources on the web.

In recent years, the web is further expanded, making it possible to describe a 3-dimensional virtual space and to set hypertext links to objects rendered by 3-dimensional graphics. Specifications of a 3-dimensional graphics descriptive language called the Virtual Reality Modeling Language (VRML) have been proposed such that, by tracing such links, web servers can be accessed sequentially one after another.

A VRML browser has also been developed for displaying a 3-dimensional space described in accordance with the specifications of the VRML. Details of the VRML are described in, for example, *Knowing VRML: Browsing and Building Cyberspace* by Mark Pesce, and translated by Kohichi Matsuda, Terunao Kamachi, Shoichi Takeuchi, Yasuaki Honda, Junichi Koyomoto, Sadayuki Ishikawa, Ken Miyashita and Kazuhiro Hara, first edition of Mar. 25, 1996, Prentice Hall publication ISBN4-931356-37-0 (which is a Japanese translation of *VRML: Browsing & Building Cyberspace* by Mark Pesce, 1995 New Readers Publishing ISBN 1-56205-498-8), and *Recent Trends in VRML and Cyber-Passage* by Kohichi Matsuda and Yasuaki Honda, bit (Kyoritsu publication)/1996, Vol. 28, No. 7, pages 29 to 36, No. 8, pages 57 to 65, No. 9, pages 29 to 36 and No. 10, pages 49 to 58.

In addition, the specifications of Version 2.0 of the Virtual Reality Modeling Language (ISO/IEC CD 14772) is available at the following URL: http://www.vrml.org/Specifications/VRML2.0/FINAL/spec/index.html. A Japanese version of the specifications is also available at the following URL: http://www.webcity.co.jp/info/andoh/VRML/vrml2.0/spec-jp/index.html.

A Community Place® Browser/Bureau is a typical browser for VRML2.0 and software for a shared server are developed as a product by Sony Corporation, the assignee of the present invention. Its prototype β version can be accessed at the following URL: http://vs.sony.co.jp.

VRML2.0 can be used to describe and express an autonomous behavior of an object in a 3-dimensional virtual space. VRML contents expressing an object dynamically moving around in a 3-dimensional virtual space are created using VRML2.0 through a process described below. It should be noted that in the following description, VRML contents are a set of script files and VRML files for expressing a sequence of behaviors of an object in a virtual space.

A sequence of processes to create VRML contents is described below.

Model creation is a process to describe attributes of an object (or a model) located in a virtual space such as the shape and the position of the object using VRML2.0 to create a basic VRML file. Sensor-node description is a process to add a description of a sensor node to a VRML file. An example of the sensor node is a TouchSensor which generates an event when a click operation or a pointing operation is carried out by using a mouse for an object in a virtual space. Another example of the sensor node is a TimeSensor which generates an event when a time set in advance is reached.

Additionally, routing edit is a process to add a description of a routing to a VRML file. The routing is used for propagating an event generated by an operation such as a pointing operation for an object for which a sensor node is added. Moreover, script-node description is a process to add a description of a script node for passing an event propagated by a routing to an external script and to add the description to a VRML file. Finally, script-file creation is a process to describe (to program) a script in a language such as Java® language developed by Sun Microsystems, Inc., for expressing a behavior set in advance for each object in a virtual space on the basis of an event propagated through a script node. Accordingly, the desired VRML contents are created through a sequence of processes work described above.

When creating VRML contents expressing an autonomous behavior of an object in a 3-dimensional virtual space on the basis of VRML2.0, existing authoring software known as a modeler is used to create the shape of an object or animation, and to output the created object or the created animation as a file in VRML2.0 format. An example of the authoring software is Studio Max®. If the modeler does not support the VRML2.0 format, it is then necessary to convert the format of the created file into the VRML2.0 format by using a converter or other equivalent means.

Then, the descriptions of a variety of sensor nodes using VRML2.0 are added to a VRML file using a text editor. The process to create a script written in the Java® language, to add a script node for the script, to add a route statement, and so on, is carried out repeatedly. In the actual operation verification, the VRML browser for VRML2.0 is activated to verify the behavior of the object by carrying out operations such as a click operation by using a mouse.

With the VRML2.0, the user is capable of defining a new node type and extending an existing node type. In addition, a defined node can be used as if the node were an existing built-in node. A technique used by the user to define a node as described above is called prototyping and the defined node is called a prototype. A keyword PROTO is used to define such prototype.

An example of an extended node defined by using the keyword PROTO is a Sony_WorldInfo announced by Sony Corporation, the assignee of the present application. The Sony_WorldInfo extended node describes attributes of a multi-user world in which a plurality of users share a virtual space using the Community Place Browser described above. It should be noted that details of the Sony_WorldInfo extended node and other information are described in, for example, *Java+VRML: Interactive* 3D World Created by Using Java and VRML2.0, by Roger Lee and translated by Kohichi Matsuda and Ken Miyashita, a Prentice Hall publication with the original publication entitled *Java for* 3D VRML Worlds.

To create a multi-user world, a virtual shared space is set in the multi-user world. A port number and an address of a server are added to its VRML file. It should be noted that the setting described above is described by an extended node.

Furthermore, by preparing an appropriate file for describing the relationship between the VRML file of an avatar, a picture file of the avatar, their indexes, an operation button picture of the avatar and the operation button and the operation of the avatar, a multi-user world can be created. It is to be noted that an avatar as used herein refers to an incarnation of a user which is an object representing the user itself appearing in a virtual environment. The term avatar originates from an Indian myth and refers therein to the incarnation of a Hindu deity.

However, a VRML2.0 authoring system does not include sufficient support for editing such prototypes such that, to define a new node as a prototype, the descriptions must be written through manual work. In addition, in the conventional authoring system, the operation of an avatar cannot be verified and an avatar cannot thus be edited.

SUMMARY OF THE INVENTION

In view of the foregoing, an information processing apparatus for describing a virtual shared space in accordance with one embodiment of the present invention comprises: a first display control means for controlling a display of a multi-user window for editing information necessary for describing the virtual shared space; a control means for controlling symbols displayed in the virtual shared space; a second display control means for controlling a display of a library window showing a list of symbols controlled by the control means; a detection means for detecting a drag-and-drop operation carried out by the user from the library window displayed by the second display control means to the multi-user window displayed by the first display control means; and a description means for describing information on symbols controlled by the control means in a predetermined file for a user operation detected by the detection means.

An information processing method for describing a virtual shared space in accordance with another embodiment of the present invention comprises: a first display control step of controlling a display of a multi-user window for editing information necessary for describing the virtual shared space; a control step of controlling symbols displayed in the virtual shared space; a second display control step of controlling a display of a library window showing a list of symbols controlled at the control step; a detection step of detecting a drag-and-drop operation carried out by the user from the library window displayed at the second display control step to the multi-user window displayed at the first display control step; and a description step of describing information on symbols controlled at the control step in a predetermined file for a user operation detected at the detection step.

A presentation medium for presenting a program executable by a computer to drive an information processing apparatus for describing a virtual shared space to carry out processing in accordance with yet another embodiment of the present invention includes: a first display control step of controlling a display of a multi-user window for editing information necessary for describing the virtual shared space; a control step of controlling symbols displayed in the virtual shared space; a second display control step of controlling a display of a library window showing a list of symbols controlled at the control step; a detection step of detecting a drag-and-drop operation carried out by the user from the library window displayed at the second display control step to the multi-user window displayed at the first display control step; and a description step of describing information on symbols controlled at the control step in a predetermined VRML file for a user operation detected at the detection step.

Accordingly, in accordance with the present invention, information on controlled symbols corresponding to detected user operations is described in a VRML file so that a virtual shared space can be more easily described.

These and other features and advantages of the present invention will be understood upon consideration of the following detailed description of the invention and the accompanying drawings.

DETAILED DESCRIPTION OF THE PREFERRED EMBODIMENTS

Figure 1:
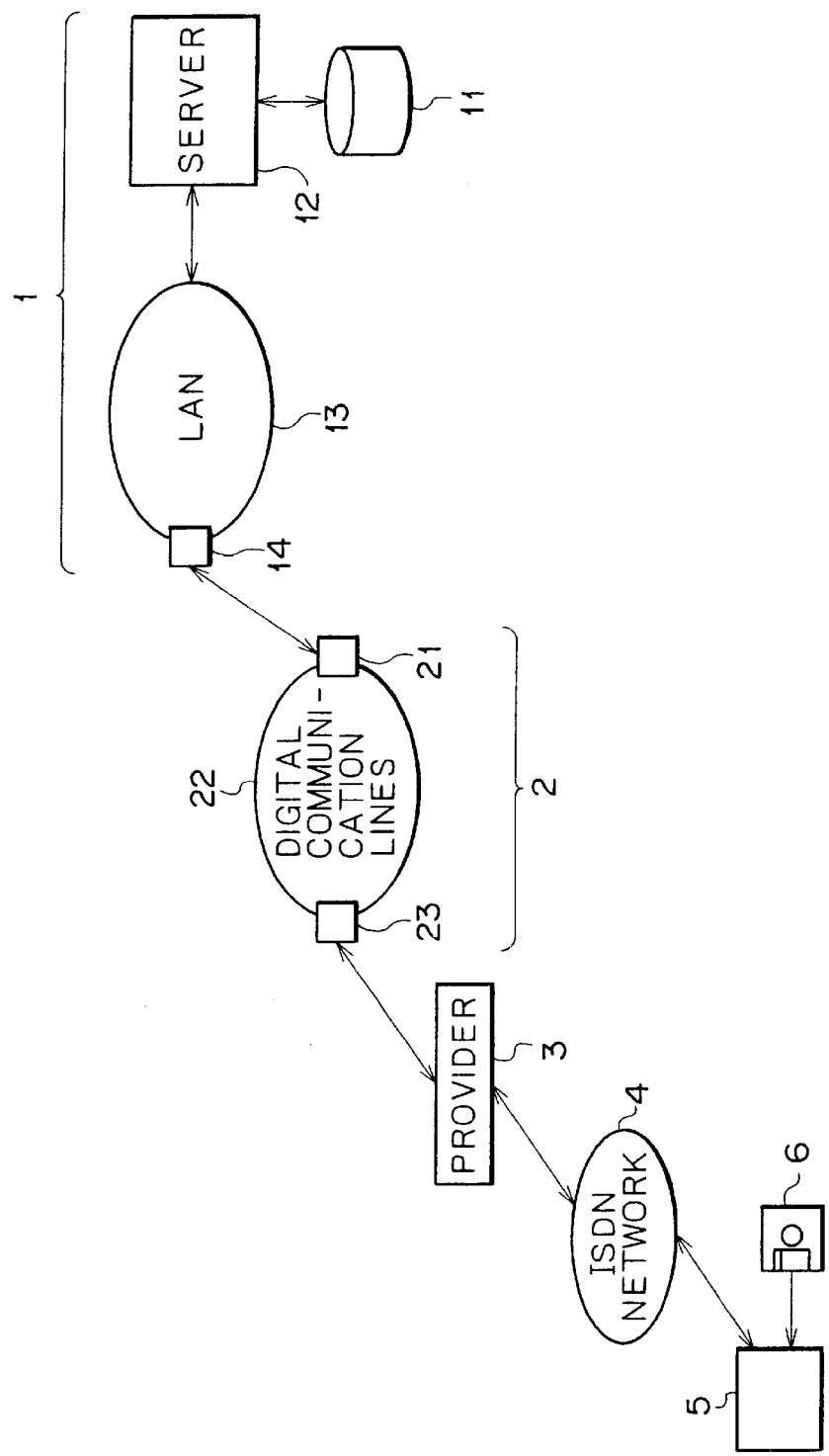
FIG. 1 is a diagram showing a typical configuration of a network system for uniformly handling information representing a 3-dimensional virtual space.

FIG. 1 illustrates a typical configuration of a network system which employs an information processing apparatus for uniformly handling information representing a 3-dimensional virtual space. As shown in the figure, the network system includes main elements such as an enterprise network 1, the Internet 2, a provider 3, an Integrated Services Digital Network (ISDN) 4, and a client terminal 5 which are connected to each other. In this example, data communication between a server 12 of the enterprise network 1 and the client terminal 5 is implemented using a Local Area Network (LAN) 13 of the enterprise network 1, a digital communication line 22 of the Internet 2, the provider 3 and the ISDN network 4.

The enterprise network 1 comprises the server 12 having a hard disc 11, the LAN 13 and a gateway 14. One embodiment of the server 12 is a server for a Community Place provided by Sony Corporation, the assignee of the present application, available at the following URL: http://vs.sony.co.jp. The server 12 acquires contents created by a user such as graphical data (a VRML file) showing the shape and the position of a 3-dimensional object (model) described by the user by using VRML2.0, by using contents creation tool 50, and a script (VRML contents stored typically in a file) which is described in a descriptive language such as the Java® language and activated in response to an operation for a model typically through a network.

The graphical data created by the user and a script are stored in the hard disc 11 to be controlled therefrom. The contents creation tool 50 will be explained later with reference to FIG. 3.

With a transfer request received from the client terminal 5, the server 12 transmits contents of a 3-dimensional virtual space stored in the hard disc 11 to the client terminal 5 originating the request by way of the LAN 13, the Internet 2, the provider 3 and the ISDN network 4. In addition, a computer program for creating contents such as the contents creation tool 50 is also provided to the client terminal 5 by way of the network connection or through a recording medium 6 such as a floppy disc.

It can be further seen, as shown in FIG. 1, that the Internet 2 comprises routers 21 and 23 and the digital communication line 22 to enable connection and communication between client terminal 5 and the server 12. Moreover, it should be noted that while only one client terminal 5 is shown in the network system of FIG. 1, it is possible to have multiple client terminals connected in a similar fashion within the scope of the present invention.

Figure 2:
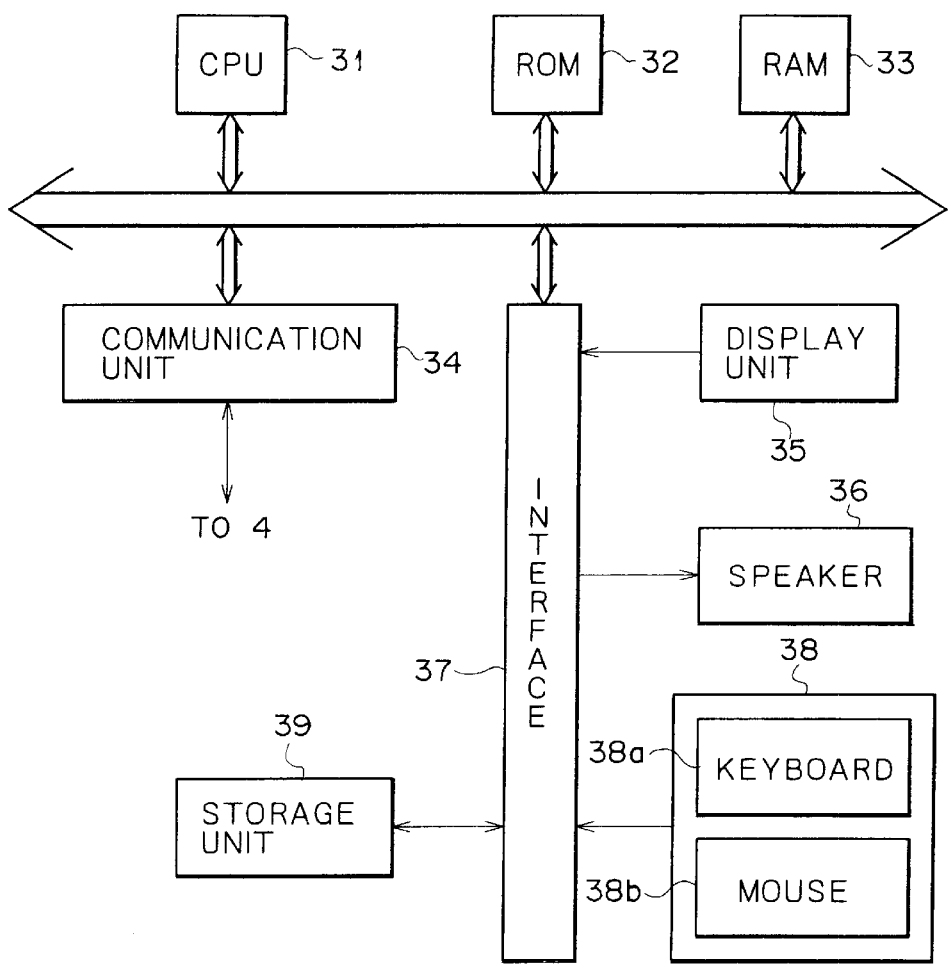
FIG. 2 is a block diagram showing a typical configuration of a client terminal employed in the network system of FIG. 1.

FIG. 2 is a block diagram showing a typical configuration of the client terminal 5 employed in the network system shown in FIG. 1. In the client terminal 5, there is provided a CPU 31 for carrying out various processing by execution of programs stored in a ROM 32. Data required in a particular processing carried out by the CPU 31 and a program are transferred to a RAM 33 to be stored therein. A communication unit 34 also provided for receiving and transmitting data from and to the ISDN network 4.

Also shown in FIG. 2 is a display unit 35 coupled to interface 37 for displaying a 3-dimensional picture of a Computer Graphic (CG) or other information. The display unit 35 can be a CRT display, an LCD display or any other equivalent display means. A speaker 36 also coupled to the interface 37 is configured to output audio signals. The client terminal 5 shown in FIG. 2 also includes an input unit 38 coupled likewise to the interface 37. As shown, the input unit 38 includes a keyboard 38a for entering data such as characters and symbols, as well as a mouse 38b which is configured to select a model displayed on the display unit 35 when a cursor of the mouse 38b points to a position of the particular model. Finally, further shown in FIG. 2 is a storage unit 39 coupled to the interface 37 for storing the contents creation tool 50 and various kinds of data. The storage unit 39 may include a hard disc, an optical disc, a MO disc or a floppy disc. As discussed above, the interface unit 37 serves as data interfaces for the display unit 35, the speaker 36, the input unit 38 and the storage unit 39.

Accordingly, in operation, the client terminal 5 receives VRML contents downloaded from the server 12 of the system shown in FIG. 1 through the network using the communication unit 34 and displays the contents on the display unit 35. In the client terminal 5, the contents creation tool 50 received through the network or the recording medium 6 is installed in the storage unit 39 to be activated by an operation carried out by the user to create contents of a 3-dimensional virtual space. The created VRML contents are then uploaded to the server 12 through the network or the recording medium 6.

In addition, the client terminal 5 modifies the display contents of a 3-dimensional space by activating a script to typically change the color of a model pointed to by the mouse 38b or to move the model in accordance with a pointing operation carried out by the user by using the input unit 38.

By changing display contents of a model in a 3-dimensional virtual space interactively in accordance with operations carried out by the user, the client terminal 5 is capable of allowing the user to feel as if the user itself were actually moving in the 3-dimensional virtual space, carrying out operations by touching a model, moving it and generating a sound.

Figure 3:
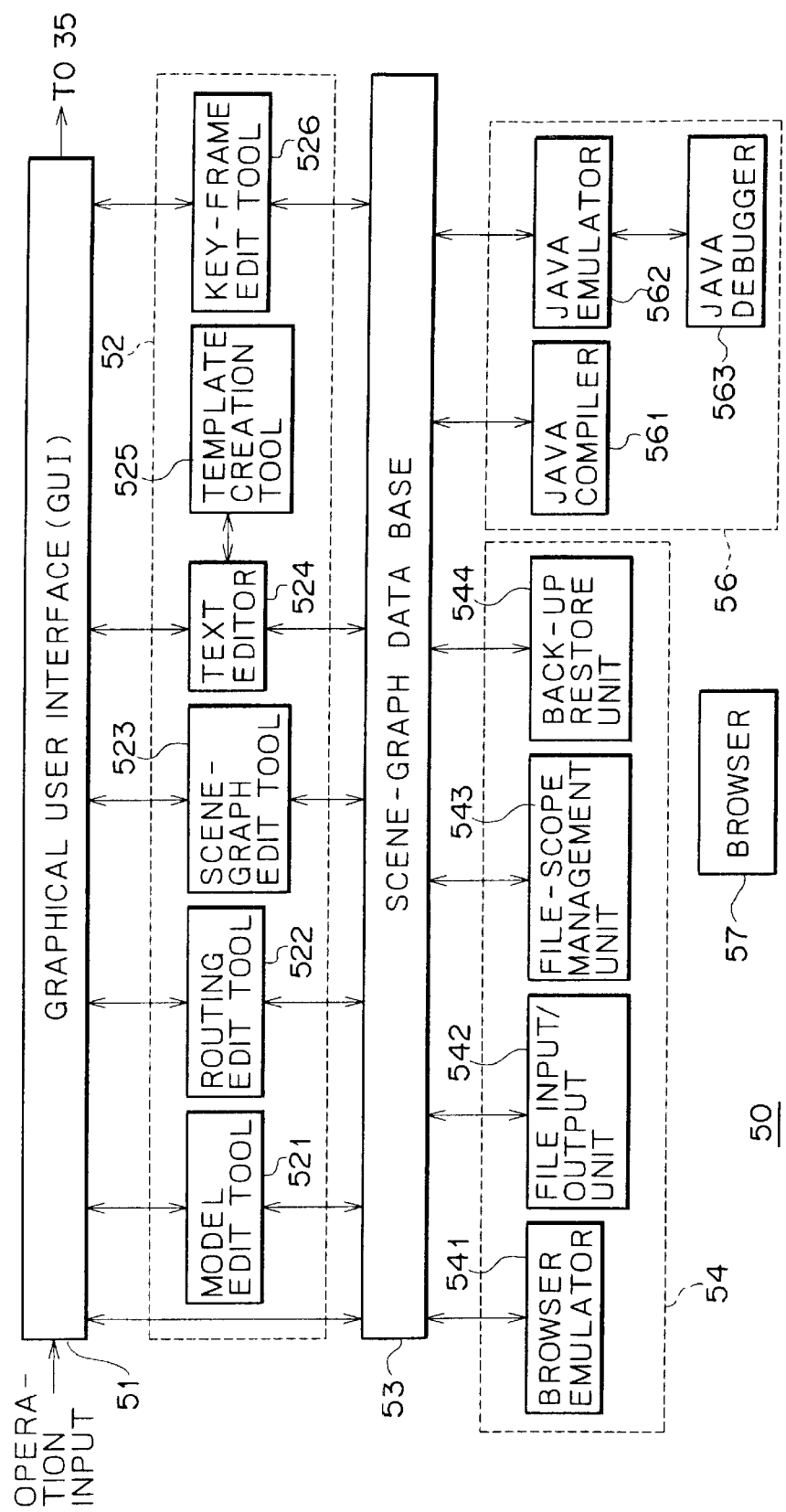
FIG. 3 is a diagram showing a typical configuration of a contents creation tool operating in the client terminal of FIG. 2.

FIG. 3 is a diagram showing a typical configuration of the contents creation tool 50 operating in the client terminal 5 shown in FIG. 2. As shown in FIG. 3, the contents creation tool 50 includes a user interface unit or a Graphical User Interface (GUI) 51, edit tools 52, a scene-graph database 53, a work tool 54, a script-creation unit 56, and a browser 57. In accordance with one embodiment of the present invention, the contents creation tool 50 is a computer program installed in the storage unit 39 employed in the client terminal 5 shown in FIG. 2. The contents creation tool 50 is configured to associate model creation process with interaction creation process into an integrated process to create contents.

As shown, the edit tools 52 include a model edit tool 521, a routing edit tool 522, a scene-graph edit tool 523, a text editor 524, a template creation tool 525 and a keyboard edit tool 526. The work tool 54 includes a browser emulator 541, a file input/output unit 542, a file scope management unit 543 and a backup restore unit 544. The script creation unit 56 includes a Java compiler 561, a Java emulator 562 and a Java debugger 563.

The user interface unit 51 displays a picture for entering various kinds of data used in the creation of a 3-dimensional space content in a window format on the display unit 35 shown in FIG. 2. In addition, the user interface unit 51 also receives input data operation entered by the user through operating a variety of buttons of a window displayed on the display unit 35 using the mouse 38b of the input unit 38, and input data operation executed via the keyboard 38a, supplying the necessary data to a variety of tools of the edit tools 52 or the scene-graph data base 53. In other words, the user interface unit 51 provides the user with a graphical user interface environment.

In addition, the user interface unit 51 receives display output data from the edit tools 52 or the scene-graph data base 53, displaying the data in a predetermined window appearing on the display unit 35. It should be noted that the configuration elements such as the edit tools 52, the scene-graph data base 53, and the work tool 54 are activated for input data operation supplied to the user interface unit 51, and carry out processing based on the input data operation supplied to the user interface unit 51.

The edit tools 52 provide the user with functions for creating graphical data of a model in a 3-dimensional virtual space and an interaction program.

The model edit tool 521 of the edit tools 52 is used for creating graphical data representing attributes of a model such as the size, the color (the shape), the position and the operation of the model by using data for creation of the model entered by the user through operations carried out for a window for model creation appearing on the display unit 35. In addition, the model edit tool 521 outputs the created graphical data (the attributes of the model) to the scene-graph data base 53. The model edit tool 521 also displays the created graphical data at a predetermined position on a model edit window on the display unit 35 3-dimensionally or 2-dimensionally through the user interface unit 51. It is to be noted that the model edit tool 521 can further be used for editing graphical data stored in the storage unit 39, graphical data read out from the recording medium 6, or graphical data received through the network.

The routing edit tool 522 of the edit tools 52 is in accordance with one embodiment of the present invention is used for editing routings associated with nodes of scripts and graphical data of a model with an appended name in a scope (a VRML file to be edited). To this end, in a routing operation, it is necessary to adjust the type of attributes (fields) of nodes of a routing start to those of a routing end. An example of the type is SFBool which is a field containing a single logical value.

With the VRML, nodes can be positioned in a hierarchy. To this end, the scene-graph edit tool 523 of the edit tools 52 can be used for editing the hierarchical structure of a model and invisible nodes such as script nodes. As an example of a hierarchical structure of nodes, there can be given a hierarchical structure comprising VRML files F1 each representing a leaf of a tree, VRML files F2 each representing a branch of the tree, a VRML file F3 representing the trunk of the tree, and a VRML file F4 representing the root of the tree which are built as hierarchical layers under a VRML file F5 representing the tree.

Figure 4:
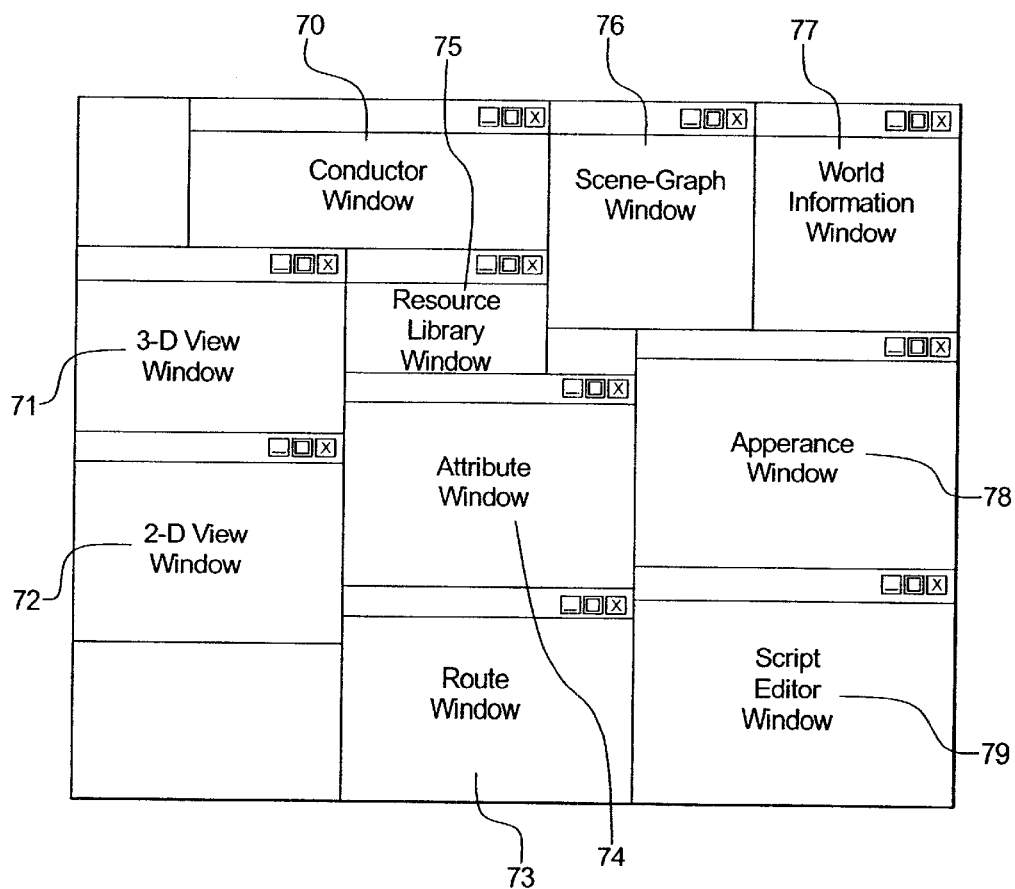
FIG. 4 is a photograph of a half-tone picture of a menu displayed on a display unit by the contents creation tool of FIG. 3.

When a user selects a VRML file as a current file to be edited, the scene-graph edit tool 523 displays the nodes to be referenced by the selected VRML file on a scene-graph window 76 as shown in FIG. 4 in a tree format (as a scene graph). A set of nodes referenced by a VRML file to be edited is referred to as a file scope (or a current scope). The scene-graph edit tool 523 limits the nodes to be edited in the creation of a routing, a key frame, a script or the like, to a file scope shown on the scene-graph window 76. In addition, the contents of a file scope and nodes to be edited are changed to nodes referenced by the VRML file after modification in accordance with a change of the VRML file edited by the user.

Referring back to FIG. 3, the text editor 524 of the edit tools 52 has edit functions of a programming language suitable for script creation by using a programming language such as Java. Accordingly, in one embodiment of the present invention, the text editor 524 is used for creating a source program of a script, and for automatically adding, deleting and changing variables in cooperation with the process to edit a script node.

Moreover, further shown in FIG. 3 is a template creation tool 525 which is a tool to be used for providing the user with convenience. The template creation tool 525 operates in cooperation with the text editor 524 to interactively create a program in the format of a conversation serving as a template of a script in accordance with operations carried out by the user for a window called a 'Script Expert'appearing on the display unit 35, and to output the template to the text editor 524. The user then adds the necessary changes to the template of the script. The template can be considered to be a source program already completed to a certain degree by using the template creation tool 525. In this manner, the user is capable of creating a script with ease.

Lastly, the key-frame edit tool 526 of the edit tools 52 is provided for creating animation, where the state of a model edited by using the model edit tool 521 (such as the coordinates of the model) changes on the screen.

Also shown in FIG. 3 is a scene-graph data base 53 provided for storing and controlling data created by the tools of the edit tools 52, and for presenting the stored data at a high speed in response to a request made by a configuration element of the work tool 54. Used for verifying created contents and the operation of a script, the work tool 54 provides functions required to create contents such as operations to record and play back data.

Accordingly, the browser emulator 541 of the work tool 54 is used by the user in applications such as verification of the operation of the created contents. The browser emulator 541 is activated when a "Play" button provided on an input picture window appearing on the display unit 35 is operated. The browser emulator 541 displays the contents stored in the scene-graph data base 53 on a modeling window appearing on the screen of the display unit 35, and further changes the display contents in accordance with an operation carried out by the user. The Play button will be described later with reference to FIG. 5.

In accordance with one embodiment of the present invention, the browser emulator 541 is configured to emulate the operation of the browser 57 and to display to the user the same results as execution of contents by using the browser 57. It should be noted that the browser emulator 541 terminates its operation when a "Stop" button is operated, which is typically provided on an input picture window, and, at such time, the user interface unit 51 displays the original input picture window. The Stop button will be described later with reference to FIG. 5.

When the browser emulator 541 ends its operation as a result of pressing of the Stop button, the browser emulator 541 outputs the stored state of each node to the scene-graph database 53. It should be noted that the user interface unit 51 displays a 3-dimensional virtual space on a modeling window on the basis of the initial state of each node supplied to the scene-graph database 53.

The file input/output unit 542 stores graphical data contents (a VRML file with the .wrl file name extension), a script with the java file name extension, graphic files with the .bmp, .jpg and .gif file-name extensions, sound files with the .wav and .mod file name extensions stored in the scene-graph database 53, and avatar data in the storage unit 39. Alternatively, the file input/output unit 542 reads out various kinds of contents data from the storage unit 39 and outputs the data to the scene-graph database 53.

In the VRML, a scope (which is an effective range of a name and a routing appended to a node) is given for each graphical data file with the .wrl file name extension in order to control node names and routings in scope units. The file scope management unit 543 of the work tool 54 as shown in FIG. 3 is configured to control the node names in the scene-graph database 53, to automatically create node names and to search for nodes. When a node accesses a plurality of files containing the same graphical data, the file scope management unit 543 propagates the changes in the files to all nodes that will reference the files.

When the browser emulator 541 is activated by operating the Play button, the back-up restore unit 544 of the work tool 54 receives the initial state of each node of a scene (a 3-dimensional virtual space generated from a VRML file) initially displayed on a modeling window from the scene-graph database 53, and stores the initial state. In this manner, it is possible to prevent an original scene from being no longer displayable due to the changes in the node states by operations carried out by the user for an interactively operable scene displayed by the browser emulator 541.

As further shown in FIG. 3, the script creation unit 56 of the contents creation tool 50 is configured to, for example, compile a script created by the user by using the text editor 524, verify the operation, and debug the script.

The Java compiler 561 of the script creation unit 56 is used for compiling the source program of a script which is written in the Java programming language and stored in the script data base 53 to generate an object program which is then output to the scene-graph database 53. The Java emulator 562 and the Java debugger 563 of the script creation unit 56 operate as an interpreter of a computer program written in the Java language, and are used by the user for verifying the operation of a script program and debugging it. In particular, the Java emulator 562 is used for emulating the operation of the object program of a script stored in the scene-graph database 53, while the Java debugger 563 is used for outputting states of the emulate operation of the Java emulator and generated errors to the scene-graph database 53.

The browser 57 of the contents creation tool 50 as shown in FIG. 3 is typically a browser which is originally used for viewing the web but improved into a browser appropriate for displaying a 3-dimensional virtual space. Contents of a 3-dimensional virtual space read out from the storage unit 39 or contents of a 3-dimensional virtual space transmitted by the server 12 shown in FIG. 1 through the network are displayed on the display unit 35. In addition, a help file for operations of configuration elements ranging from the user interface unit 51 to the work tool 54 is also displayed. It should be noted that the Community Place Browser proposed by the assignee of the present application can also be used as the browser 57.

Next, characteristic functions of the content creation tool 50 are described.

When the user, using the mouse 38*b*, presses the Play button displayed on a window appearing on the screen of the display unit 35, the browser emulator 541 executes and displays contents thus created. This function is referred to as "an operation verifying function". This function does not require a verifying operation by activating the browser 57 after created contents have been saved. To this end, the user is capable of verifying the operation of contents created so far at any time during the work to create the contents.

When the user presses the Play button, the Java compiler 561 of the script creation unit 56 automatically compiles the source program of a script which is typically stored in a file with the java file name extension, generating an object program to allow the user to verify an operation. This function is referred to as a "make function".

By storing the state of contents at the beginning of the verifying operation and the viewpoint of the user in the back-up store unit 544, the contents, display contents of the model, and the viewpoint of the user can be restored to the state at the beginning of the verifying operation when the browser emulator 541 stops its operation as the user presses the Stop button displayed on a window appearing on the screen of the display unit 35 by using the mouse 38*b*. This function is referred to as a "back-up restore function".

The user uses the text editor 524 of the edit tools 52 to create a source program of a script in a programming language that is suitable for creating the script. An example of the programming language is Java. Then, the Java compiler 561 of the script creation unit 56 is used to compile the source program using the text editor 524 to generate an object program. This work is referred to as the "creation of a script program". The object program is executed to verify an operation using the browser emulator 541. Finally, the object program is executed to operate the contents on the browser 57.

In addition, debug codes can be added to the source program. In this case, when a program containing debug codes is executed using the Java emulator 562, the Java debugger 563 of the script creation unit 56 displays information such as input/output values of the script, enabling the debugging operation of the script to be carried out. This operation is referred to as a "debug function".

When the user interactively sets input/output values of a script node in the format of a conversation, the template creation tool 525 of the edit tools 52 creates a template of a source program of the script which is suitable for the setting. This operation is referred to as a "template automatic creation function". Moreover, the user can create a source program of the script for implementing a desired event by changing the template using the text editor 524. In this manner, the process to create the entire source program of the script using an editor can be eliminated and, in addition, it is possible to prevent a simple coding miss from being generated.

FIG. 4 is a photograph of a menu screen displaying the contents creation tool 50 displayed on the display unit 35 by the user interface unit 51. In this example, windows ranging from a conductor window 70 to a script editor 79 are displayed. Of course, it is also possible to display only the necessary windows. An example of a window that is not displayed in this figure is a multi-user window 81 which will be described later with reference to FIG. 6.

The conductor window 70 of the menu screen is a window for executing the overall control of the content creation tool 50 to carry out new creation, loading, and saving of contents as well as operations to verify the created contents or to halt such verification operations. In addition, it is also possible to carry out other operations such as to switch a mouse mode, to add a model or to delete a model.

On a 3D view window 71 as shown on the menu screen of FIG. 4, a 3-dimensional perspective projection drawing of a created graphical data is displayed. By using this 3D view window 71, the operating mode of a model can be changed, or, a rotated or shifted picture of a selected model can be displayed. The operating mode of a model can be a rotation mode, a shift mode, or a viewpoint movement mode.

Further shown in the menu screen of FIG. 4 is a parallel view window 72 which displays a side view, a top view, or a wire-frame drawing of a model appearing on the 3D view window 71 in 2-dimensions. Moreover, a route window 73 as shown in FIG. 4 is used for editing a routing of an event.

Additionally, an attribute window 74 of the menu screen is used for setting attributes of a node subjected to routing and its node name (DEF name). It should be noted that a DEF name can also be set by using a scene-graph window 76 and the route window 73. In a scene-graph window 76, the nodes of a current scope are displayed by laying out the nodes in a hierarchy. Further, a resource library window 75 of the menu screen is used for controlling six libraries, namely, textures, sound, scripts, protos, wizards and avatars. It should be noted that an avatar controlled by the resource library window 75 will be described later.

Referring again to FIG. 4, a world information window 77 of the menu screen is used for setting three nodes, namely, a background node, a world information node, and a navigation information node. In an operation to set a background node by using the world information window 77, a texture and a color of a background can be determined. In an operation to set a world information node, information such as a title, an author and a creation date can be recorded in a VRML file. In an operation to set a navigation information node, a navigation operation can be set.

Also shown in FIG. 4 is an appearance window 78 which is used for setting a color of a model or a texture to be added to the model. In addition. the script editor 79 shown in the menu screen is used for editing VRML and Java files as well as for compiling a Java program.

Figure 5:
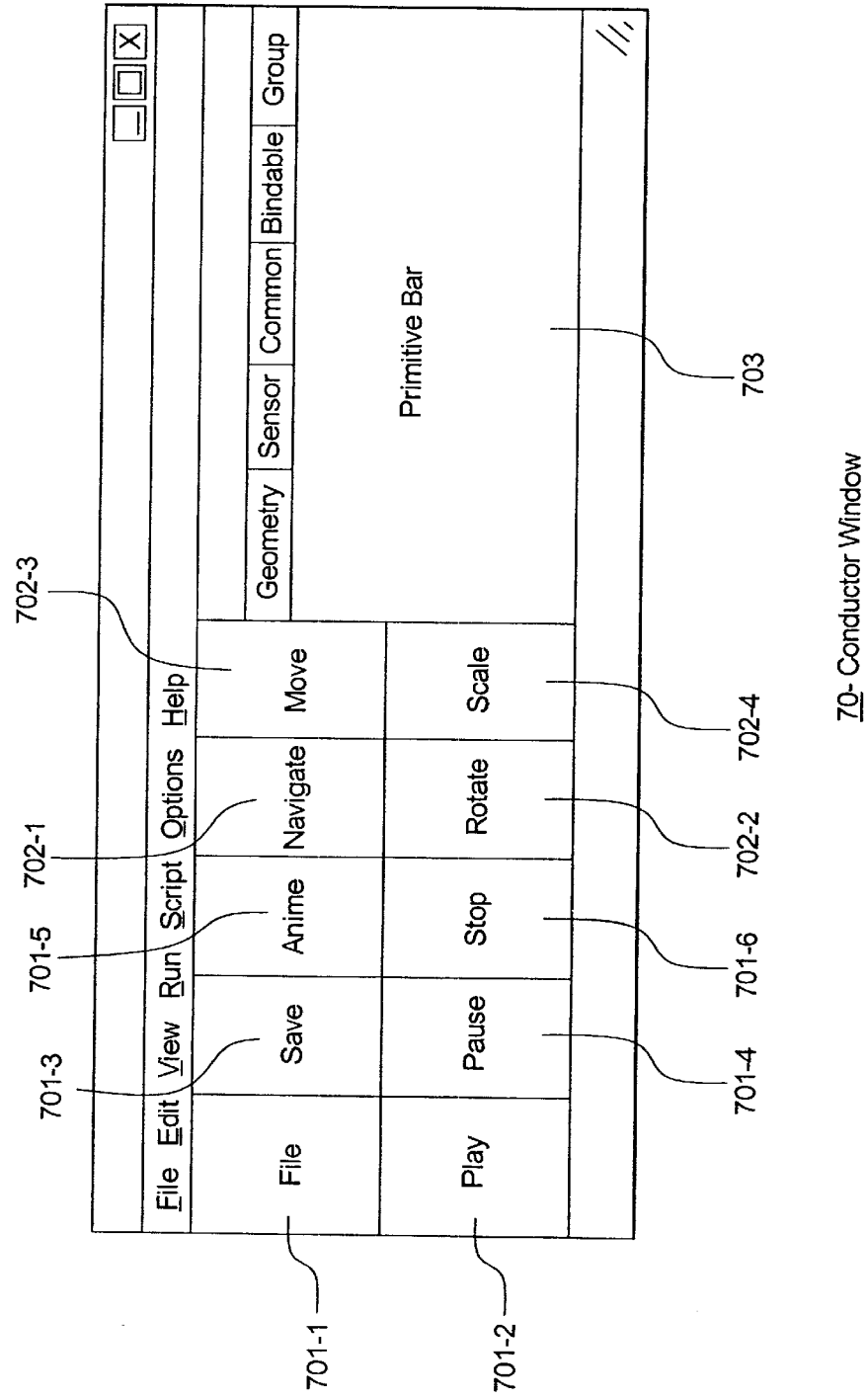
FIG. 5 is a photograph of a half-tone picture of a typical conductor window displayed on the display unit.

FIG. 5 is a photograph of a detailed configuration of the conductor window 70 shown in FIG. 4. A File button 701-1 typically operates to load the contents stored in the storage unit 39 as a file. A Play button 701-2 carries out an operation to verify the created contents (in a simulation mode). A Save button 701-3 operates to store contents in the storage unit 39. A Pause button 701-4 temporarily suspends a verification operation being carried out, while a Stop button 701-6 operates to halt the activated verification operation. An Anime button 701-5 activates a key frame editor for creating animation or to terminate the activated key frame editor.

The buttons 702-1 to 702-4 are operated to set a mouse mode as follows. A Navigate button 702-1 sets a mode in which a viewpoint is moved in the parallel view window 72 or in the 3D view window 71. A Rotate button 702-2 operates to set a mode in which a model is rotated. A Move button 702-3 sets a mode in which a model is moved, while a Scale button 702-4 sets a scale of a model. Lastly, a primitive bar 703 shown in FIG. 5 is used for selecting and adding a geometry node, a sensor node, a common node, a bindable node, and a group node.

Figure 6:
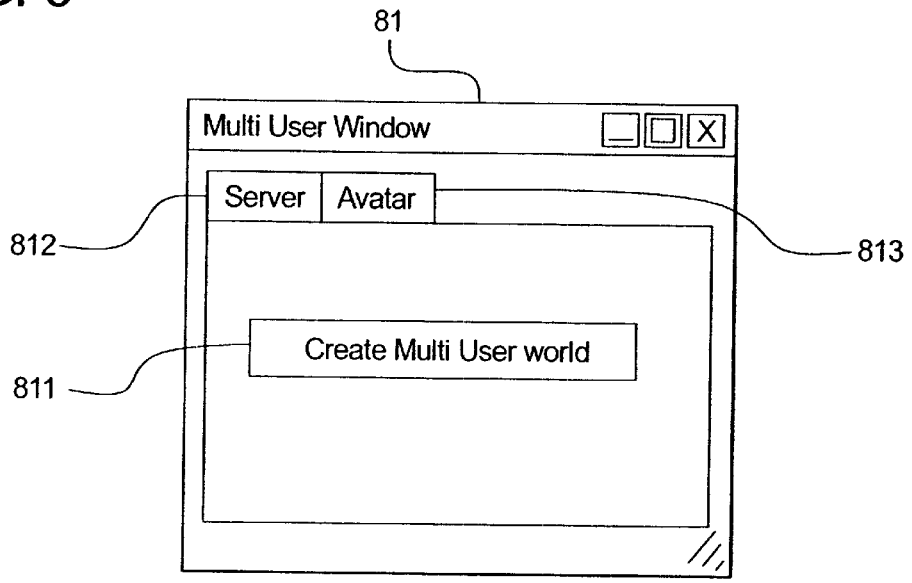
FIG. 6 is a diagram showing an example of a multi-user window displayed on the display unit.

FIG. 6 is a diagram showing an example of a multi-user window 81 included in the menu screen but not shown in FIG. 4. A Create-Multi-user-World button 811 is displayed on the multi-user window 81 as shown in FIG. 6 when contents being edited are not set in the multi-user world, that is, when a Sony_WorldInfo node which is an extended node is not described in the scene-graph window 76.

The Create-Multi-user-World button 811 is operated to set contents being edited in the multi-user world. To be more specific, when the Create-Multi-user-World button 811 is pressed, the Sony_WorldInfo node is added to the contents currently being edited and displayed on the scene-graph window 76. It should be noted that, in order to restore the contents being edited to the single-user world, it is necessary to delete the Sony_WorldInfo node from a VRML file displayed on the scene-graph window 76.

Figure 7:
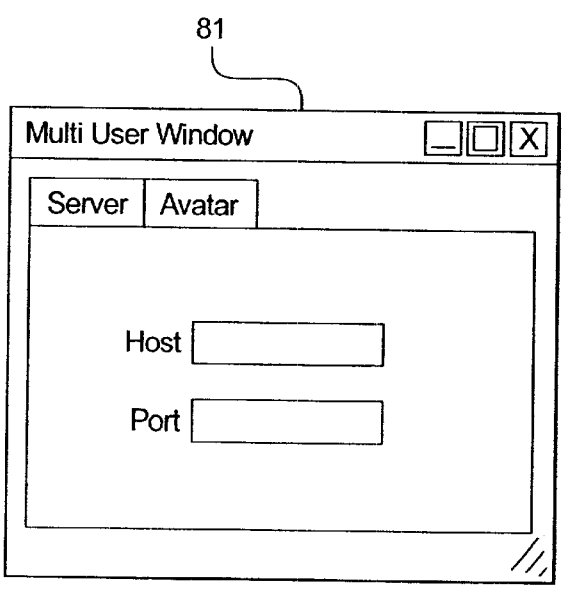
FIG. 7 is a photograph of a half-tone picture of a typical server page of the multi-user window displayed on the display unit.

In addition, an avatar-tab button 813 and a server-tab button 812 which can be operated when contents being edited are set in the multi-user world are displayed on the multi-user window 81. The server-tab button 812 is operated to display a server page for setting a host name and a port number of a multi-user server on a multi-user window 81 as shown in FIG. 7. A local-host name is set on a host column of the server page and the number 5126 is set on a port column as initial values. The number 5126 is the default port number of a bureau which is a server application. Thus, when the bureau is activated in the client terminal 5 (FIG. 1) with the local-host name and the port number kept at their initial values, an operation to verify contents can be carried out with ease. It should be noted that the setting on the server page is reflected in a cpBureau field of the Sony_WorldInfo node at which the local host name and the port number of the server are described.

Figure 8:
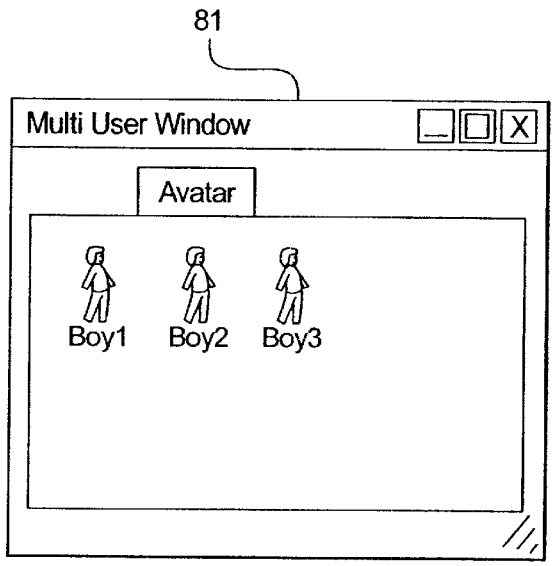
FIG. 8 is a photograph of a half-tone picture of a typical avatar page of the multi-user window displayed on the display unit.

As shown in FIG. 8, the avatar-tab button 813 is operated to display an avatar page showing avatars that can be used by the user in the multi-user world being edited. Moreover, as shown in FIG. 9, a drag-and-drop operation can be carried out on any icon representing an avatar displayed on the avatar page of a resource library window 75 to add the avatar to the avatar page of the multi-user window 81 as an avatar that can be used by the user in the multi-user world being edited.

Figure 10:
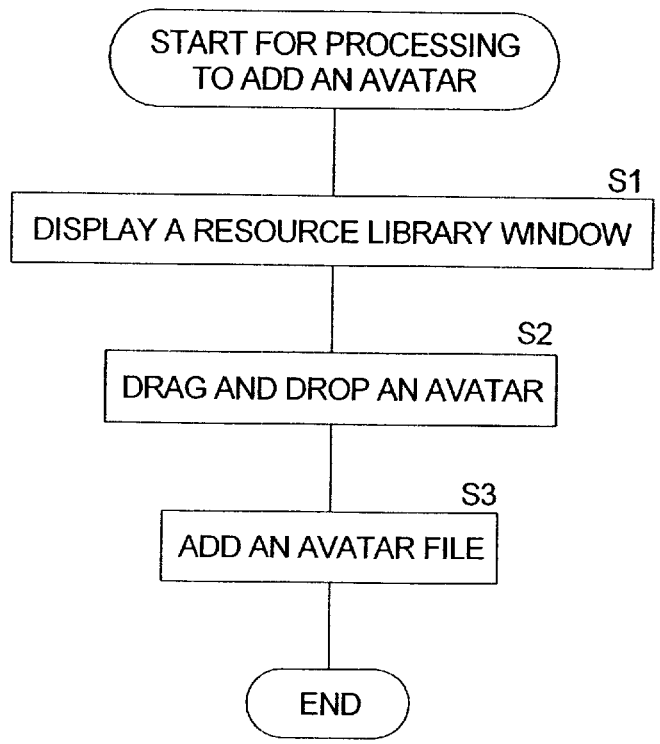
FIG. 10 shows a flowchart representing avatar addition processing.

The procedure to add an avatar discussed above will be explained with reference to a flowchart shown in FIG. 10. As shown in FIG. 10, the flowchart begins with step S1 at which the user interface unit 51 (FIG. 3) displays a list of avatars maintained in the scene-graph database 53 on the resource library window 75 (FIG. 4) in accordance with an operation carried out by the user to operate an avatar tag of the resource library window 75 to select an avatar to be added. The list of avatars is referred to as an avatar page.

Figure 9:
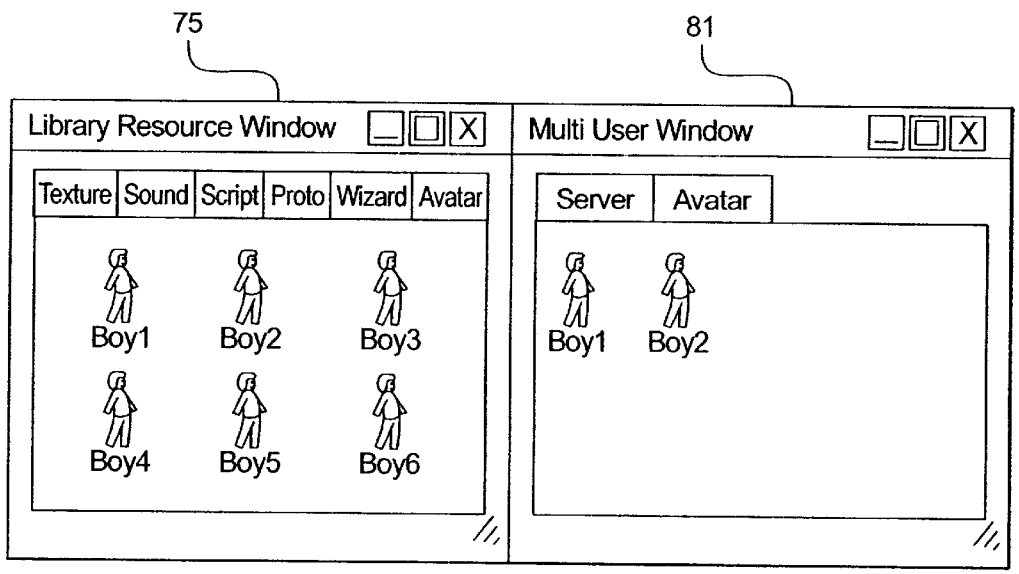
FIG. 9 is a photograph of a half-tone picture of a typical avatar page of the multi-user window and a resource library window displayed on the display unit.

Then, the procedure proceeds to step S2 where a drag-and-drop operation is carried out by the user on an icon representing an avatar selected from those displayed on the avatar page of the resource library window 75, to add (drag and drop) the avatar to the avatar page of the multi-user window 81 (FIG. 9). Thereafter, at step S3, the user interface unit 51 detects the operation carried out by the user at step S2, displaying a dragged and dropped avatar icon on the avatar page of the multi-user window 81 as an additional avatar. Then, in accordance with this drag-and-drop operation, the file input/output unit 542 and the file-scope management unit 543 of the contents creation tool 50 (FIG. 3) provide the file of the dragged and dropped avatar at a place where a VRML file being edited is recorded, thus generating an avtimg directory and an avtwrl directory and describe the predetermined avatar data therein.

It should be noted that an avatar page can be displayed on the resource library window 75 only when the contents being edited are contents of the multi-user world.

Figure 11:
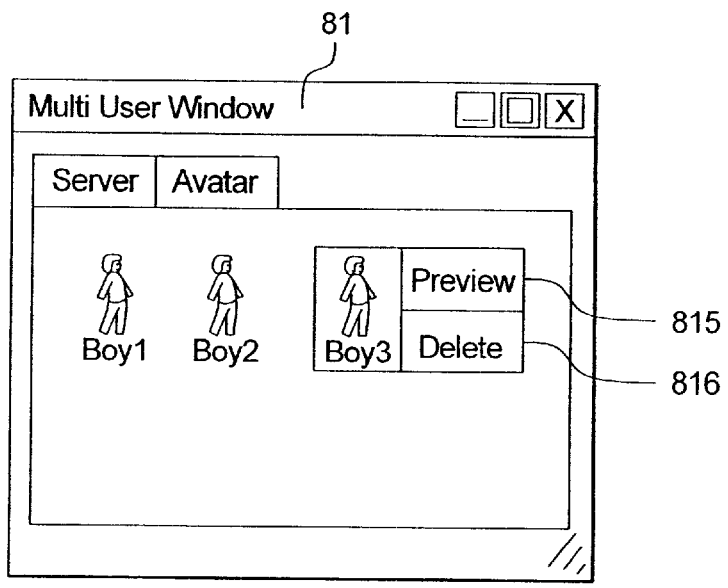
FIG. 11 is a photograph of a half-tone picture of a typical avatar page of the multi-user window displayed on the display unit.

On the other hand, when it is desired to delete an avatar from an avatar page on the multi-user window 81 showing avatars useable in the multi-user world being edited, the avatar to be deleted is selected from the avatar page, and a Delete key of the keyboard 38a at the input unit 38 of the client terminal 5 (FIGS. 1 & 2) is pressed or a right button of the mouse 38b at the input unit 38 of the client terminal 5 is clicked. At this time, as shown in FIG. 11, a pop-up menu is displayed, and by selecting a Delete item 816 from the menu, the selected avatar is deleted from a list of avatars that can be used in the multi-user world.

Figure 12:
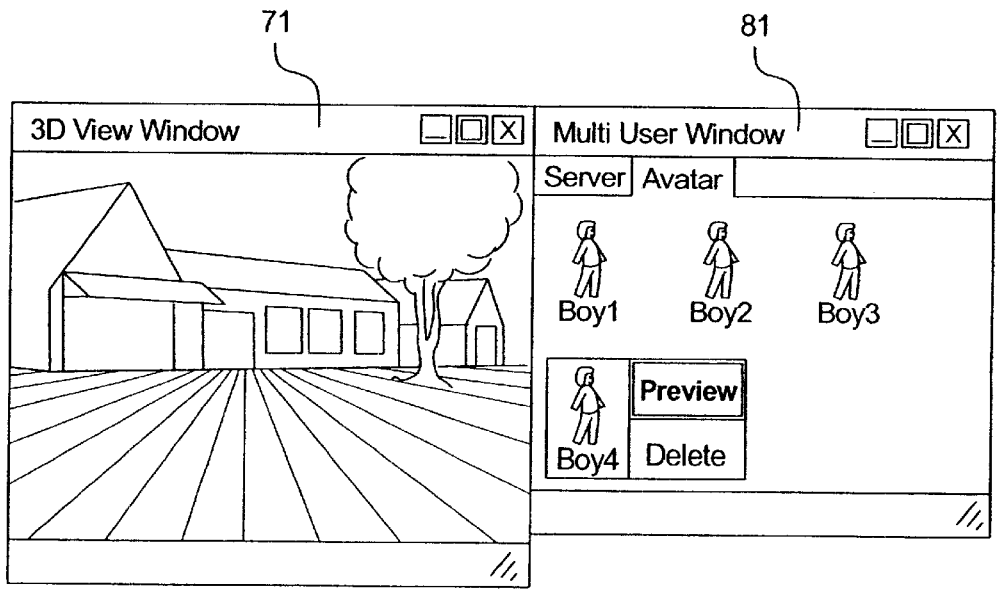
FIG. 12 is a photograph of a half-tone picture of a typical avatar page of the multi-user window and a 3D view window displayed on the display unit.
Figure 13:
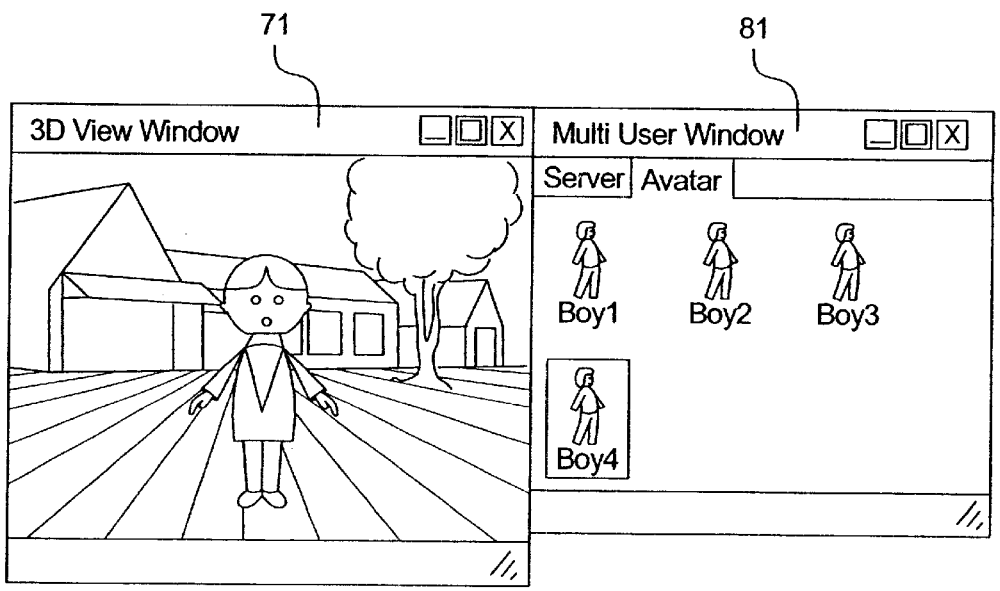
FIG. 13 is a photograph of a half-tone picture of a typical avatar page of the multi-user window and a 3D view window displayed on the display unit.

In order to verify or edit any avatar included in a list of avatars that can be used in the multi-user world in a virtual space displayed on a 3D view window 71, an avatar to be verified or edited is selected from those on the avatar page of the multi-user window 81, and the right button of the mouse 38b is clicked to select a preview item 815 from a pop-up menu displayed as shown in FIG. 12. This operation results in the selected avatar to be displayed and superposed in a virtual shared space on a 3D view window 71 as shown in FIG. 13. When the user arbitrarily edits this avatar in this state in the same manner as a graphical model in a virtual space, the edit operation is detected by the user interface unit 51 and the edit tools 52 carry out appropriate processing.

It should be noted that, at that time, in a VRML file displayed on the scene-graph window 76 to correspond to the multi-user world displayed on the 3D view window 71, an inline node is generated, and the edit information of the avatar is described in the inline node. Assuming that the VRML file is a main program, an inline node can be considered to correspond to a subroutine program read out from the main program. However, since the inline node (or the data of an edited avatar) is generally generated due to the fact that an avatar is edited in a virtual shared space, the inline node is deleted from the VRML file and saved at a predetermined place when the VRML file is saved.

In order to terminate the work to edit the avatar, the avatar being edited is selected from those on the avatar page of the multi-user window 81, and the right button of the mouse 38b is clicked to display a pop-up menu from which, the preview item 815 is again selected.

It should be noted that a computer program to be executed to carry out the processing described above is presented to the user through presentation media which can be network presentation media such as the Internet and a digital satellite or information recording media such as a CD-ROM and a magnetic disc.

Accordingly, in accordance with the present invention, information on controlled symbols corresponding to detected user operations is described in a VRML file so that a virtual shared space can be more easily described.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An information processing apparatus for describing a virtual shared space, comprising:
   first display control means for controlling a display of a multi-user window for editing information to describe said virtual shared space;
   control means for controlling one or more symbols displayed in said virtual shared space;
   second display control means for controlling a display of a library window showing a list of the symbols;
   detection means for detecting a drag-and-drop operation from said library window to said multi-user window; and
   description means for describing information on the symbols in a predetermined file for a detected operation.

2. The apparatus of claim 1 wherein said description means includes a Virtual Reality Modeling Language (VRML).

3. The apparatus of claim 1 wherein said predetermined file is a Virtual Reality Modeling Language (VRML) file.

4. The apparatus of claim 1 wherein said description means describes information provided to said multi-user window in said predetermined file.

5. The apparatus of claim 1 further including edit means for displaying and superposing said symbols in said virtual shared space, and editing said symbols.

6. The apparatus of claim 5 wherein each of said symbols is an avatar corresponding to a user in said virtual shared space.

7. An information processing method for describing a virtual shared space, said method comprising the steps of:

controlling a display of a multi-user window for editing information to describe said virtual shared space;

controlling one or more symbols displayed in said virtual shared space;

controlling a display of a library window showing a list of said controlled symbols;

detecting a drag-and-drop operation from said library window to said multi-user window; and describing information on said symbols controlled in a predetermined file for a detected operation.

8. The method of claim 7 wherein said step of describing said information includes the step of using a Virtual Reality Modeling Language (VRML).

9. The method of claim 7 wherein said predetermined file is a VRML file.

10. A presentation medium for presenting a program executable by a computer to operate an information processing apparatus for describing a virtual shared space to carry out said processing, including:

a first display control step of controlling a display of a multi-user window for editing information to describe said virtual shared space;

a control step of controlling one or more symbols displayed in said virtual shared space;

a second display control step of controlling a display of a library window showing a list of symbols controlled at said control step;

a detection step of detecting a drag-and-drop operation from said library window to said multi-user window; and a description step of describing said information on said one or more controlled symbols in a predetermined file for a detected operation.

11. The presentation medium of claim 10 wherein said information on said one or more symbols is described using a Virtual Reality Modeling Language (VRML).

12. The presentation medium of claim 10 wherein said predetermined file is a Virtual Reality Modeling Language (VRML) file.

13. An information processing system for describing a virtual shared space, comprising:

a multi-user window for displaying one or more avatars selected by a user for the virtual shared space;

a library window for displaying a plurality of avatars available for display in the virtual shared space;

a controller for controlling the display of the one or more avatars in the multi-user window, the display of a plurality of available avatars in the library window, and the display of the one or more selected avatars in the virtual shared space;

a detector for detecting a movement of the one or more avatars between the multi-user window and the library window; and;

a description tool for describing information on the one or more avatars in a predetermined file for a movement detection.

14. The apparatus of claim 13 wherein said description tool includes a Virtual Reality Modeling Language (VRML).

15. The apparatus of claim 13 wherein said predetermined file is a VRML file.

16. The apparatus of claim 13 wherein said description tool describes information provided to said multi-user window in said predetermined file.

17. The apparatus of claim 13 further including an edit tool for editing said avatars.

18. The apparatus of claim 17 wherein said edit tool is configured to superimpose said one or more avatars in said virtual shared space.

19. The apparatus of claim 18 wherein each of said avatar corresponds to a user in said virtual shared space.

20. The apparatus of claim 13 wherein said virtual shared space is a 3-dimensional space.

21. The apparatus of claim 13 wherein each of said one or more avatars in the virtual shared space is displayed in 3-dimension.

22. The apparatus of claim 13 wherein said multi-user window is configured to display three avatars.

23. The apparatus of claim 13 wherein said library window is configured to display 16 avatars available for display in the virtual shared space.

24. The apparatus of claim 13 wherein when the one or more avatars is moved from the library window to the multi-user window, the moved one or more avatars is no longer displayed in the library window.

25. The apparatus of claim 24 wherein the one or more moved avatars is displayed in the virtual shared space.

26. The apparatus of claim 13 wherein when the one or more avatars is moved from the multi-user window to the library window, the moved one or more avatars is no longer displayed in the multi-user window.

27. The apparatus of claim 26 wherein the moved one or more avatars is not longer displayed in the virtual shared space.

28. The apparatus of claim 13 further including a display unit, wherein the multi-user window, the library window and the virtual shared space is displayed on said display unit.

29. The apparatus of claim 28 wherein said display unit is one of a cathode ray display unit, a LCD display unit, or a plasma display unit.

30. The apparatus of claim 13 further including an input unit, wherein said user moves said one or more avatars between said multi-user window and said library window with said input unit.

31. The apparatus of claim 30 wherein said input unit is one of a computer mouse, a keyboard, or a touchpad.

32. The apparatus of claim 13 wherein when said detector detects said movement of said one or more avatars from said library window to said multi-user window, said controller controls the display of the virtual shared space to display the moved one or more avatars in realtime with respect to the detection.

33. A method of providing an information processing system for describing a virtual shared space, comprising the steps of:

displaying one or more avatars selected by a user for the virtual shared space in a multi-user window;

displaying a plurality of avatars available for display in the virtual shared space in a library window;

controlling the display of the one or more avatars in the multi-user window, the display of a plurality of available avatars in the library window, and the display of the one or more selected avatars in the virtual shared space;

detecting a movement of the one or more avatars between the multiuser window and the library window; and;

describing information on the one or more avatars in a predetermined file for a movement detection.

34. The method of claim 33 wherein said step of describing said information includes using a Virtual Reality Modeling Language (VRML).

35. The method of claim 33 wherein said predetermined file is a VRML file.

36. The method of claim 33 wherein said step of describing includes the step of describing said information provided to said multi-user window in said predetermined file.

37. The method of claim 33 further including the step of editing said avatars.

38. The method of claim 37 wherein said step of editing further includes the step of superimposing said one or more avatars in said virtual shared space.

39. The method of claim 38 wherein each of said avatar corresponds to a user in said virtual shared space.

40. The method of claim 33 wherein said virtual shared space is a 3 dimensional space.

41. The method of claim 33 wherein each of said one or more avatars in the virtual shared space is displayed in 3-dimensions.

42. The method of claim 33 wherein said multi-user window is configured to display three avatars.

43. The method of claim 33 wherein said library window is configured to display 16 avatars available for display in the virtual shared space.

44. The method of claim 33 wherein when the movement of the one or more avatars from the library window to the multi-user window is detected at said detection step, the moved one or more avatars is no longer displayed in the library window.

45. The method of claim 44 wherein the one or more moved avatars is displayed in the virtual shared space.

46. The method of claim 33 wherein when the movement of the one or more avatars from the multi-user window to the library window is detected at said detection step, the moved one or more avatars is no longer displayed in the multi-user window.

47. The method of claim 46 wherein the moved one or more avatars is not longer displayed in the virtual shared space.

48. The method of claim 33 further including the step of providing a display unit, wherein the multi-user window, the library window and the virtual shared space is displayed on said display unit.

49. The method of claim 48 wherein said display unit is one of a cathode ray display unit, a LCD display unit, or a plasma display unit.

50. The method of claim 33 further including the step of providing an input unit, wherein said user moves said one or more avatars between said multi-user window and said library window with said input unit.

51. The method of claim 50 wherein said input unit is one of a computer mouse, a keyboard, or a touchpad.

52. The method of claim 13 wherein when said movement of said one or more avatars from said library window to said multi-user window is detected at said detection step, said step of controlling controls the display of the virtual shared space to display the moved one or more avatars in realtime with respect to the detection.

* * * * *